(12) United States Patent
McDonald

(10) Patent No.: US 7,952,495 B1
(45) Date of Patent: May 31, 2011

(54) DATA ENTRY DEVICE AND METHOD

(75) Inventor: Michael McDonald, Louisville, KY (US)

(73) Assignee: American Printing House for the Blind, Louisville, KY (US)

( * ) Notice: Subject to any disclaimer, the term of this patent is extended or adjusted under 35 U.S.C. 154(b) by 1047 days.

(21) Appl. No.: 11/735,754

(22) Filed: Apr. 16, 2007

(51) Int. Cl.
*G09B 21/00* (2006.01)
(52) U.S. Cl. ...................... 341/22; 340/825.19; 382/114; 434/113
(58) Field of Classification Search .................... 341/22; 340/825.19; 434/113, 114; 382/114
See application file for complete search history.

(56) References Cited

U.S. PATENT DOCUMENTS 5,993,089 A * 11/1999 Burrell, IV ................... 400/100

* cited by examiner

*Primary Examiner* — Brian A Zimmerman
*Assistant Examiner* — Hung Q Dang
(74) *Attorney, Agent, or Firm* — James E. Cole; Middleton Reutlinger

(57) ABSTRACT

A method and device for entering data is provided wherein the pressing of up to two combinations of proximate keys on a keypad concurrently sends a signal or signals from the keypad to a processor. The processor receives the signal or signals and identifies a character, symbol, or function associated with the signal or signals and reports the same. In one embodiment, the keypad used for entering the data has a configuration of three columns and four rows. A method of identifying a character, symbol, or function comprises comparing the signal or signals to a data set of associated characters, symbols, or functions wherein the data set is mapped to said signal or signals with a modified Braille cell.

16 Claims, 6 Drawing Sheets

DATA ENTRY DEVICE AND METHOD

FIELD OF THE INVENTION

The present invention relates to data entry methods and devices, more particularly to data entry on a standard twelve key telephone keypad.

BACKGROUND OF THE INVENTION

It is known to input data into a device using a standard telephone keypad having twelve keys. The widespread use of portable devices such as cellular telephones and PDAs has created a need to input data on small hand held devices in addition to the traditional telephones. Such devices have been enlarged to accommodate a larger keypad having thirty or more keys so that a character or symbol can be input with the single touch of a single key. However, in enlarging the keypad some of the portability of these devices has been comprised. Therefore, data entry on a standard telephone keypad having three columns and four rows of keys has become desirable. However, the input of characters, symbols, or functions has been a difficult problem because the number of possible characters greatly exceeds the number of available keys. Attempts at solving this problem have included "triple-tapping" wherein a key is pressed a number of times equal to that character's location in a set of characters displayed on the key. This method has been found to be slow and cumbersome. Another method for character input using a standard telephone keypad is "T9", developed by Tegic Communications. This method associates sequences of groups of letters on each key with a dictionary of common words. This method has also been found to be slow and cumbersome, especially when inputting data that is not a common word or sentence. Another twelve key data entry method includes pressing a first key having a group of characters associated with it and pressing a second key to identify the location of the character within the group. This requires sequentially pressing a plurality of keys, in a particular order, resulting in a slow data input method.

SUMMARY OF THE INVENTION

A data entry device and method is provided. The device has at least twelve keys arranged in rows and columns for data entry. A code is mapped to the keys enabling at least sixty three key code combinations, each combination being associated with a specific character, symbol, operator, or function. The keys are mapped in such a way as to allow a user to input data with a single thumb or digit on each hand. Providing a mapping of up to two combinations of proximate keys on a keypad wherein each key in the combinations can be concurrently pressed with a single thumb or digit provides for two digit or thumb data entry. Even though any code, known or unknown, may be mapped to the keys, a known code, such as a Braille cell, provides for a more efficient introduction of the device to users. However, in the embodiment having a Braille cell mapped to the twelve key keypad, there are key combinations which include more than two groups of proximate keys, making it difficult if not impossible to input data with a single thumb or digit on each hand. Yet, in mapping the Braille cell to the standard twelve key keypad, a row and a column of keys are available for association with such key combinations. Therefore, in one embodiment, a modified Braille cell has been mapped to a standard twelve key keypad providing the ability for a user to enter data with a single thumb or digit on each hand.

BRIEF DESCRIPTION OF THE FIGURES

The figures herein disclose several embodiments of the present invention and are not to be interpreted as limiting the scope of the present invention.

DETAILED DESCRIPTION

It is to be understood that various changes can be made by one skilled in the art in one or more of the several parts of the apparatus and in one or more of the several steps in the method disclosed herein without departing from the scope or spirit of the present invention.

A method and device for entering data is provided wherein the pressing of up to two combinations of proximate keys on a keypad concurrently sends a signal or signals from the keypad to a processor. The term concurrently as used herein means that each key making up an input code for a character, number, symbol, operator, or function must be depressed or held down concurrently. One key in the key combination may be pressed slightly before or after other keys in the key combination and the keys may be pressed in any order. As long as the keys making up the key combination are all held down at the same time, the keys have been pressed concurrently. The processor receives the signal or signals and identifies a character, symbol, or function associated with the signal or signals and reports the same. In a one embodiment, the keypad used for entering the data is a standard telephone keypad found on a telephone, cellular phone, PDA, etc., having twelve keys situated in three columns and four rows. Any code may be mapped to the keypad, but it is preferable that a code already known be used. One method of identifying a character, symbol, or function comprises comparing the signal or signals to a data set of associated characters, symbols, or functions wherein the data set is associated with the signal or signals with a modified Braille cell. A Braille cell, having two columns and three rows, is mapped to the first and third columns of the telephone keypad leaving open the middle column and bottom row of the telephone keypad for associating with hard to press key combinations. Mapping a modified Braille cell having the middle column of keys associated with key combinations having non-proximate keys or more than two proximate keys in the first or third column, to the telephone keypad enables a user to type with one thumb or digit from each hand.

Figures 1, 2:
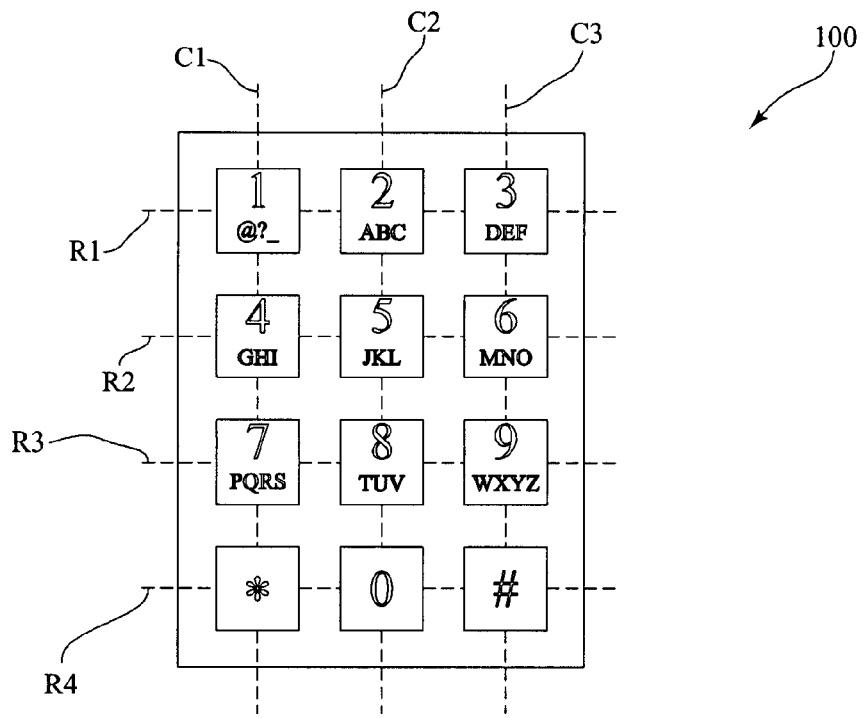
FIG. 1 is a plan view of a standard twelve key keypad showing columns and rows of proximate keys.
FIG. 2 is a plan view of a modified twelve key keypad having adjacent keys.

FIG. 1 shows a standard twelve key keypad 100 having three columns and four rows of keys. Column 1, designated as C1, column 2, designated as C2, and column 3, designated as C3, are shown. The four separate rows are designated as R1 for row 1, R2 for row 2, R3 for row 3, and R4 for row 4. Typically, a standard telephone keypad has numbers and letters associated therewith as shown in FIG. 1. For example, the key positioned at C1R1 has number one and the key positioned at C2R1 has numeric designation two and the associated letters "A", "B" and "C".

Each key in keypad 100 is proximate a neighboring key or keys in the same row and column. For example, key C2R2 is proximate keys C2R1, C2R3, C1R2, and C3R2. In an embodiment of keypad 100, these keys have proximity such that a plurality of proximate keys can be selectively pressed with a single thumb or digit in a single stroke. Preferable, a distance between the edges of proximate keys in keypad 100 does not exceed the width of an average thumb or finger print.

FIG. 2 shows a modified twelve key keypad 200 having adjacent keys wherein the keys in each row and column have an edge adjacent neighboring keys in the same column and row. Such a configuration of adjacent keys enables a user to more easily enter a plurality of adjacent keys with a single thumb or digit in a single stroke. Keypad 100 having proximate keys, shown in FIG. 1, and keypad 200, having adjacent keys, may be used in a device for inputting data in accordance with the instant invention. A distance between neighboring keys is dependent upon the size of each key and the size of the thumb or digit print wherein a user can press at least two neighboring keys on keypad 100 or 200 with a single stroke. Therefore, a keypad used in inputting data according the present invention may have a multitude of configurations and keypads 100 and 200 are only examples of two of such embodiments.

Figure 3:
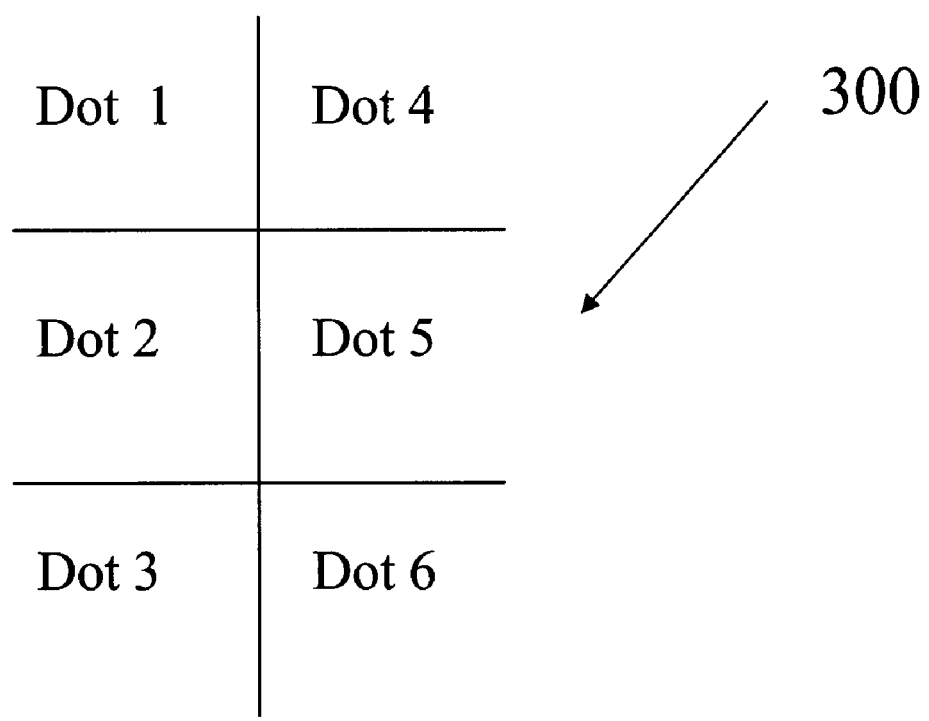
FIG. 3 is a schematic view of a standard Braille cell.

FIG. 3 shows a standard Braille cell 300 having two columns of three rows making a six Dot Braille cell. In the first column and first row is Dot 1; first column second row is Dot 2; first column third row is Dot 3; second column first row is Dot 4; second column second row is Dot 5; and second column third row is Dot 6. One or more Dots may be presented in up to sixty three different combinations. Each combination of one or more Dots is associated with a specific character, symbol, function, or operator. For example, in a standard Braille cell, Dot 1 alone is associated with the letter "A" and the combination of Dots 2, 3, 4 and 5 are associated with the letter "T".

Figure 4:
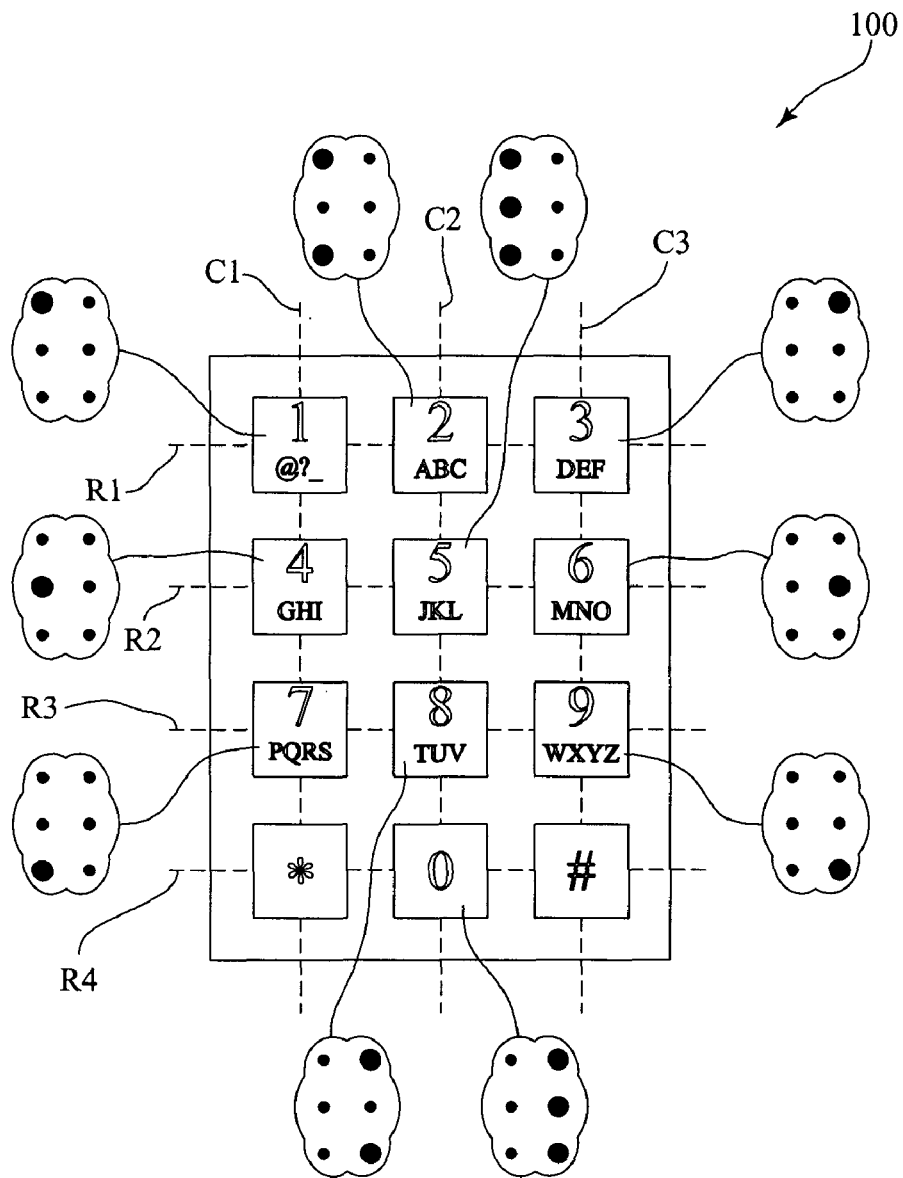
FIG. 4 is a plan view of the key keypad of FIG. 1 mapped to a modified Braille cell.

FIG. 4 is a schematic view of a standard twelve key telephone keypad, as the one shown in FIG. 1 or 2, having the standard Braille cell 300 transposed thereon and mapped therewith. Column 1 of the Braille cell having Dots 1, 2, and 3 is associated with keys C1R1, C1R2, and C1R3 respectively. Column 2 of the Braille cell having Dots 4, 5, and 6 are associated with keys C3R1, C3R2, and C3R3 respectively. Such transposition leaves C2 of the twelve key keypad as well as keys C1R4 and C3R4 open for association. In a modified Braille cell, the keys in C2 are associated with combinations of Dots that present a challenge pressing concurrently. It is to be understood that this embodiment of mapping a Braille cell to a telephone keypad to provide a method of typing with a standard twelve key keypad is provided only as an embodiment of the instant invention as other, known and unknown, mapping codes may provide a twelve key keypad having the ability to enter data with a single thumb or digit of each hand.

There are dozens of known ways to produce combinations of letters, symbols, operators, or functions by applying the 63 key combinations that one may create with overlaying a six dot system, such as Braille, on a standard telephone keypad. For instance, computer Braille may be the basic building block. Grade 1 Braille may be mapped to the keys as it is a code used for literary use. Grade II Braille may be used to add contractions and let a key combination stand for several letters. Grade II Braille heavily depends on the context of the symbol. For instance, if the letter "B" key combination appears within a word, it is associated with the letter "B". If the key combination stands alone or has a space on both sides, it stands for the word "but". This is but one example where a key combination for a letter stands for a word as there are multiple symbols that can stand for a word or a group of characters. Another example is grade 3 Braille, much like grade 2, but grade 3 has more contractions. Many users of Braille make up their own grade 3 key combinations, depending on the subject matter. Another example of a Braille code that may be mapped to the twelve key keypad is Nemith which is a code used in math and science. Additionally, there are Braille code systems for languages other than English such as French and Spanish that may be mapped to a key pad as shown in FIG. 1 or 2 providing for the entry of data. Furthermore, Braille codes or codes derived therefrom are only examples of known codes that may be mapped to the telephone keypad providing for the pressing of up to two combinations of proximate keys on a keypad concurrently to represent a symbol, character, etc., as any code, known or unknown, may be mapped to the twelve key keypad to provide a method of data entry.

Figure 5:
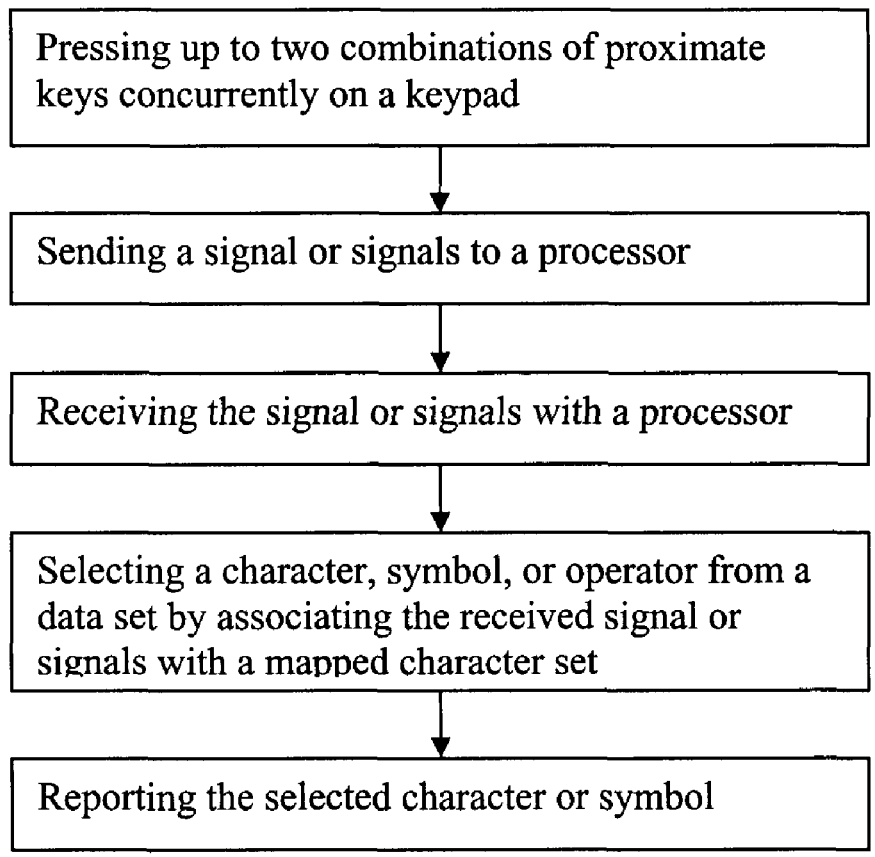
FIG. 5 is a process flow diagram.

FIG. 5 shows a process flow diagram. A user inputs a character into a twelve key keypad by concurrently pressing up to two combinations of proximate keys on a keypad. Advantageously, this is accomplished with a single digit or thumb from each hand. A signal or signals is sent from the keypad to a processor. The processor receives the signal or signals and selects a character, symbol, or operator from a data set mapped to the keypad by associating the received signal or signals with the character, symbol, or operator associated therewith. The processor then reports the associated character, symbol, or operator.

Figure 6:
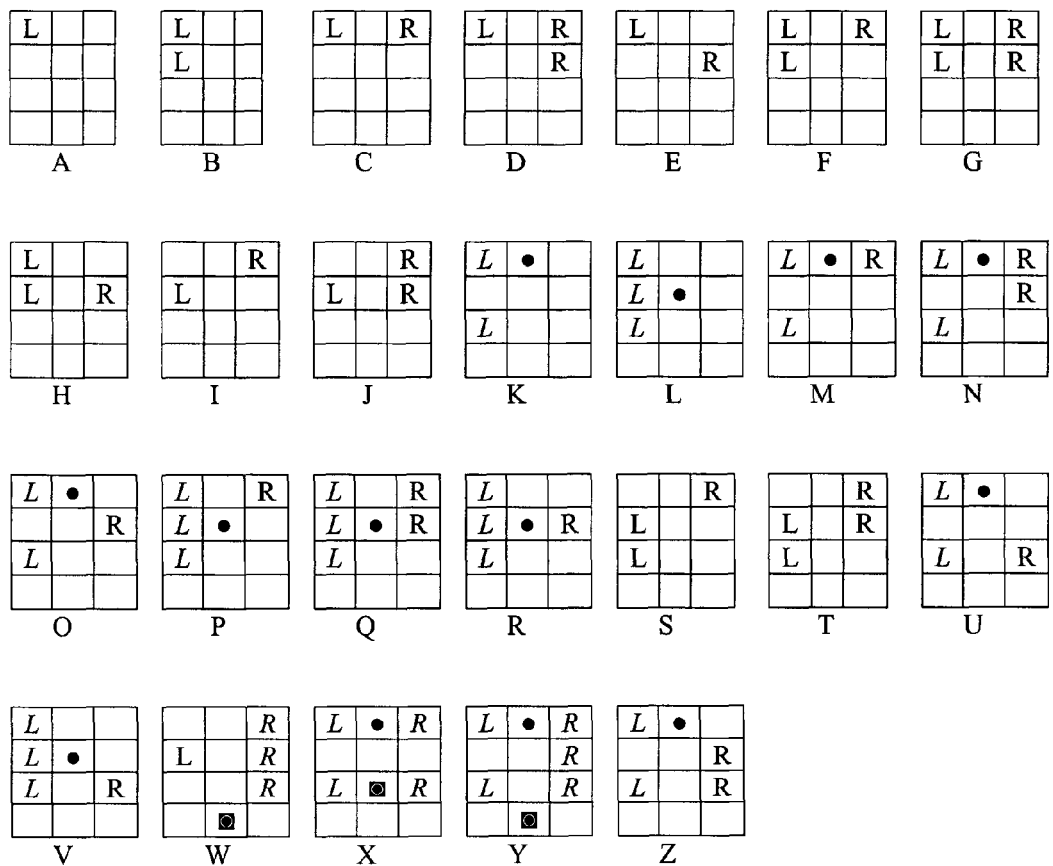
FIG. 6 is a schematic view of an embodiment of an alphabetic code mapped to the keypad of FIG. 1 or 2 used in the identifying step of the process shown in FIG. 5.

FIG. 6 shows a modified Braille cell transposed onto a standard twelve key keypad. In this embodiment, twenty six characters representing the English alphabet are mapped onto the keypad. The letter associated with each configuration of Dots is shown below the representative Dot configuration. The "L" and "R" designation within each Dot location designates whether a thumb or digit from the left or right hand is more appropriate for pressing that key. For example, a thumb or digit on the left hand would be appropriate for entering the C1R1 key associated with the letter "A". In the block diagram associated with some of the letters are right and/or left hand designations in italics. The italicized letter indicates that some difficulty is anticipated in pressing this key combination with a single digit or thumb and as such a key in column two has been associated with this particular key combination. The "●" symbol is used to represent an alternative left hand key representing the left hand key combination while the "■" symbol is used to represent an alternative right hand key representing the right hand key combination. For example, the letter "K" may be input into the twelve key keyboard by concurrently pressing keys C1R1 and C1R3 or by pressing key C2R1 alone. Even though these keys are designated for the left hand, a digit or thumb from either or both hands may be used to press the appropriate keys. The modified Braille cell is most advantageous when entering combinations of Dots that would be almost impossible with a standard Braille cell transposed on the keypad. This advantage of the modified Braille cell is best shown in the "X" and "Y" key combinations. In the "X" combination, it would be very difficult if not impossible to enter the C1R1, C1R3, C3R1, and C3R3 keys concurrently as shown in the transposed Braille cell. However, the modified Braille cell allows a user to enter C2R1 and C2R3 concurrently to represent the letter "X".

Figure 7:
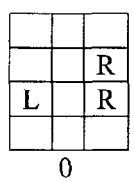
FIG. 7 is a schematic view of an embodiment of a numeric code mapped to the keypad of FIG. 1 or 2 used in the identifying step of the process shown in FIG. 5.
Figure 7:
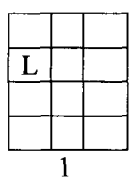
Figure 7:
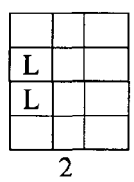
Figure 7:
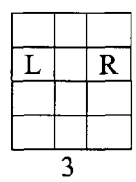
Figure 7:
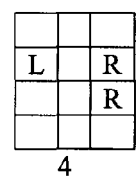
Figure 7:
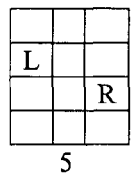
Figure 7:
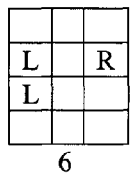
Figure 7:
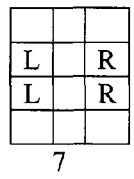
Figure 7:
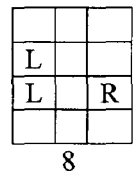
Figure 7:
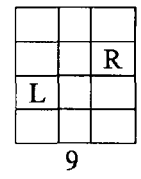

FIG. 7 is a schematic view of an embodiment of a numeric code used in the identifying step of the process shown in FIG. 5. A computer Braille cell is transposed onto a standard twelve key keypad. In this embodiment, ten digits are mapped onto the keypad. The digit associated with each configuration of Dots is shown below the representative Dot configuration. The "L" and "R" designation within each Dot location designates whether a thumb or digit from the left or right hand is more appropriate for pressing that key. For example, a thumb or digit on the left hand would be appropriate for entering the C1R2 and C1R3 keys associated with the digit "2".

While the present invention has been shown and described herein in what are considered to be embodiments thereof, the invention is not limited to those specific embodiments. Thus, the forms of the invention shown and described herein are to be taken as illustrative only and other embodiments may be selected without departing from the scope of the present invention, as set forth in the claims appended hereto. For example, any code, known or unknown may be mapped to the twelve key keypad to provide a method of data entry with a single digit or thumb from each hand.

I claim:

1. A method for entering and identifying data comprising:
    pressing up to two combinations of keys on a keypad concurrently, said keypad having at least a first column, second column, and third column, and at least a first row, second row, third row, and fourth row of keys;
    sending a signal or signals from said keypad to a processor;
    receiving said signal or signals from said keypad with said processor;
    identifying a character, symbol, or function associated with said signal or signals; and
    reporting said character or symbol;
    wherein said step of identifying a character or symbol comprises comparing said signal or signals to a data set of associated characters, symbols, or functions;
    wherein said data set is associated with said signal or signals with a modified Braille cell;
    wherein said modified Braille cell is associated with said signal or signals sent from said keypad in accordance with the following:

| Braille cell | Keypad Key |
| --- | --- |
| Dot 1 | First column, First row |
| Dot 2 | First column, Second row |
| Dot 3 | First column, Third row |
| Dot 4 | Third column, First row |
| Dot 5 | Third column, Second row |
| Dot 6 | Third column, Third row |
| Dots 1 and 3 | Second column, First row |
| Dots 1, 2, and 3 | Second column, Second row |
| Dots 4 and 6 | Second column, Third row |
| Dots 4, 5, and 6 | Second column, Fourth row. |

2. The method for entering and identifying data of claim 1 wherein said keypad is a standard telephone keypad having a first column, second column, and third column, and a first row, second row, third row, and fourth row of keys.

3. The method for entering and identifying data of claim 1 wherein said keypad has said keys which are one of adjacent or proximate.

4. A data entry device comprising:
    a keypad having twelve keys arranged in three columns and four rows;
    a processor interpreting a signal or signals from said keypad and associating a character, symbol, or function in a data set with said signal or signals; and
    said data set being mapped to said keypad as to associate the concurrent pressing of up to two combinations of keys on said keypad with said character, symbol, or function;
    wherein said data set mapped to said keypad is a modified Braille cell; wherein said modified Braille cell has Dots 1, 2, and 3 associated with a first column of said keypad and Dots 4, 5, and 6 associated with a third column of said keypad.

5. The data entry device of claim 4 wherein said modified Braille cell has a second column of said keypad associated with combinations of keys in said first column and keys in said third column.

6. The data entry device of claim 5 wherein said modified Braille cell has a key in a first row of said second column associated with a key in said first row of said first column and a key in a third row of said first column of said keypad.

7. The data entry device of claim 4 wherein said modified Braille cell has a key in a second row of said second column associated with a key in said first row of said first column, a key in a second row of said first column, and a key in said third row of said first column of said keypad.

8. The data entry device of claim 4 wherein said modified Braille cell has a key in said third row of said second column associated with a key in said first row of said third column and a key in said third row of said third column of said keypad.

9. The data entry device of claim 4 wherein said modified Braille cell has a key in a fourth row of said second column associated with a key in said first row of said third column, a key in said second row of said third column, and a key in said third row of said third column of said keypad.

10. A twelve key data input keypad having a first, second, and third column with a first, second, third, and fourth row, a plurality of said twelve keys being mapped to a code wherein said code associates a character, symbol, or function to up to two combinations of proximate keys on a keypad concurrently pressed allowing a user to input data with said twelve key input keypad with a single digit or thumb on each hand, wherein said code mapped to said keypad is a modified Braille code wherein Dots 1, 2, and 3 are associated with keys in said first column at rows 1, 2, and 3 respectively and Dots 4, 5, and 6 are associated with keys in said third column at rows 1, 2, and 3 respectively.

11. The twelve key data input keypad of claim 10 wherein each of said twelve keys have an edge adjacent each neighboring key.

12. The twelve key data input keypad of claim 10 wherein said second column of keys is mapped to key combinations having keys in said first and third columns.

13. The twelve key data input keypad of claim 12 wherein said key in said first row of said second column of keys is associated with said keys in said first and third rows of said first column.

14. The twelve key data input keypad of claim 12 wherein said key in said second row of said second column of keys is associated with said keys in said first, second and third rows of said first column.

15. The twelve key data input keypad of claim 12 wherein said key in said third row of said second column of keys is associated with said keys in said first and third rows of said third column.

16. The twelve key data input keypad of claim 12 wherein said key in said fourth row of said second column of keys is associated with said keys in said first, second, and third rows of said third column.

* * * * *